United States Patent
Klinkenberg et al.

(10) Patent No.: US 6,867,244 B2
(45) Date of Patent: Mar. 15, 2005

(54) PHOTOACTIVATABLE COATING COMPOSITION

(75) Inventors: Huig Klinkenberg, Katwijk Aan Zee (NL); Josephus Christiaan Van Oorschot, Arnhem (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/423,542

(22) Filed: Apr. 25, 2003

(65) Prior Publication Data

US 2003/0212164 A1 Nov. 13, 2003

Related U.S. Application Data

(62) Division of application No. 09/865,025, filed on May 24, 2001, now Pat. No. 6,579,913.

(30) Foreign Application Priority Data

May 26, 2000 (EP) .............................................. 00201850

(51) Int. Cl.[7] ........................... C09D 175/04; C08J 7/04
(52) U.S. Cl. ........................... 522/174; 522/31; 522/39; 522/63; 522/83; 522/84; 428/423.1; 428/425.8; 428/457
(58) Field of Search .............................. 522/31, 39, 63, 522/83, 84, 174, 180; 428/423.1, 425.1, 457

(56) References Cited

U.S. PATENT DOCUMENTS

| | | | |
|---|---|---|---|
| 4,369,206 A | 1/1983 | Mayer et al. | 427/54.1 |
| 5,627,010 A | 5/1997 | Pai et al. | 430/270.1 |
| 5,650,261 A | 7/1997 | Winkle | 430/270.1 |
| 5,846,897 A | 12/1998 | Blank et al. | 502/150 |
| 5,861,235 A | 1/1999 | Harkness et al. | 430/325 |
| 6,225,021 B1 | 5/2001 | Widawski et al. | 430/270.1 |

FOREIGN PATENT DOCUMENTS

| | | | |
|---|---|---|---|
| EP | 188 880 A2 | 7/1986 | ......... C08F/283/00 |
| EP | 448 224 A1 | 9/1991 | ............ C08F/2/38 |
| EP | 898 202 A1 | 2/1999 | ........... G03F/7/038 |
| FR | 2 773 162 A1 | 7/1999 | ........... C08G/18/38 |
| GB | 2 307 473 A | 5/1997 | ............ C07F/5/02 |
| WO | WO 93/17060 | 9/1993 | ........... C08G/63/20 |

OTHER PUBLICATIONS

Harkness et al., "Demonstration of a Directly Photopatternable Spin–On–Glass Based on Hydrogen Silsesquioxane and Photobase Generators," Macromolecules 1998, 31, pp. 4798–4805.

*Primary Examiner*—Susan Berman
(74) *Attorney, Agent, or Firm*—Michelle J. Burke; Joan M. McGillycuddy

(57) ABSTRACT

Photoactivatable coating composition comprising at least one photoinitiator and a base-catalysed polymerisable or curable organic material comprising at least one polyisocyanate and at least one compound containing isocyanate reactive groups, wherein the isocyanate reactive groups comprise at least one thiol group and the photoinitiator is a photolatent base.

Preference is given to a coating composition wherein the photolatent base is selected from the group of N-substituted 4-(ortho-nitrophenyl)dihydropyridine, a quaternary organoboron photoinitiator, and an α-amino acetophenone. The composition additionally may comprise an organic acid, a metal complex and/or a metal salt as a cocatalyst and/or a sensitiser selected from the group of thioxanthones, oxazines, rhodamines, and preferably from the group of benzophenone and derivatives thereof.

9 Claims, No Drawings

PHOTOACTIVATABLE COATING COMPOSITION

CROSS REFERENCE TO RELATED APPLICATION

The present application is a divisional of U.S. Ser. No. 09/865,025, filed on May 24, 2001 now U.S. Pat. No. 6,579,913.

This application claims priority of European Application No. 00201850.5, filed on May 26, 2000.

BACKGROUND OF THE INVENTION

1. Field of the Invention

The invention relates to a photoactivatable coating composition comprising at least one photoinitiator and a base-catalysed polymerisable or curable organic material comprising at least one polyisocyanate and at least one compound comprising isocyanate reactive groups, and to its use for the preparation of coatings with a rapidly processable surface at ambient temperature.

2. Discussion of the Prior Art

Photoactivatable coating compositions of the type indicated above are known from, int. al., U.S. Pat. No. 4,369,206. In this document use is made of ammonium salts of α-ketocarboxylic acids as photoinitiator, and the photoactivatable coating compositions comprise polyurethane or epoxide resin precursors hardening in the presence of amines. A drawback to the known compositions is that they are only cured in places which are readily accessible to UV light. In the case of three-dimensional surfaces, or where the presence of pigments does not allow the UV radiation to penetrate into lower layers, the curing speed is too low.

EP-A-0 898 202 discloses the photogeneration of amines from α-amino acetophenones as latent base catalyst in a base-catalysed coating composition. The curable systems only comprise organic compounds which are capable of reacting in a base-catalysed reaction or a condensation reaction. Specific mention. is made of a (poly)alcohol and a (poly)isocyanate. In order to increase the curing speed in places which are not readily accessible to UV light, mention is made of the possible use of an additional unblocked base catalyst, which, however, requires the use of an additional thermal step.

The invention now provides coating compositions which can be cured by UV radiation and have an acceptable curing speed at ambient temperature in places which are not readily accessible to UV light, which compositions comprise at least one photoinitiator and a base-catalysed polymerisable or curable organic material comprising at least one polyisocyanate and at least one compound comprising isocyanate reactive groups.

SUMMARY OF THE INVENTION

The photoactivatable coating composition according to the invention is characterised in that the isocyanate reactive groups comprise at least one thiol group and the photoinitiator is a photolatent base.

DETAILED DESCRIPTION OF THE INVENTION

It should be added that photoactivatable coating compositions comprising a photoinitiator and a polymerisable or curable organic material consisting of a (poly)isocyanate and a compound comprising thiol groups are known from, int. al., EP-A-0 188 880. The coating layers produced with the coating compositions disclosed therein can be cured first by UV radiation and then, thoroughly, in a conventional manner at ambient temperature. A major drawback to the known coating compositions is the simultaneous presence of at least two entirely different curing mechanisms. One mechanism is based on the reaction between a multifunctional alkene and a multifunctional thiol, which requires UV radiation, whereas the secondary cure comprises a great many mechanisms such as the reaction of free isocyanate with water and the reaction of free isocyanate with the thiol component. One effect of this so-called dual cure system is that unexposed places will only be cured in part, resulting in an unreacted amount of alkene in the unexposed places. Therefore, in order to still achieve a minimum degree of curing in these places, use will have to be made of compounds having a higher functionality. Using such compounds has a viscosity increasing effect, which leads to a greater quantity of solvent being required to achieve a similar spraying viscosity, which is attended with an increase in the VOC.

A further advantage of the photoactivatable coating composition according to the invention is that when a photolatent base is used, it will remain active even after the exposure has ended.

Suitable photolatent bases include N-substituted 4-(o-nitrophenyl)dihydropyridines, optionally substituted with alkyl ether and/or alkyl ester groups, and quaternary organoboron photoinitiators. An example of an N-substituted 4-(o-nitrophenyl)dihydropyridine is N-methyl nifedipine (*Macromolecules* 1998, 31, 4798), N-butyl nifedipine, N-butyl 2,6-dimethyl 4-(2-nitrophenyl) 1,4-dihydropyridine 3,5-dicarboxylic acid diethyl ester and a nifedipine according to the following formula

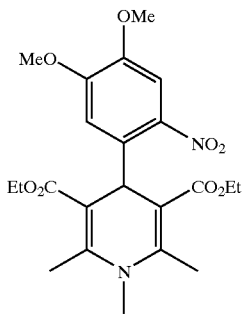

i.e., N-methyl 2,6-dimethyl 4-(4,5-dimethoxy-2-nitrophenyl) 1,4-dihydropyridine 3,5-dicarboxylic acid diethyl ester. Examples of quaternary organo-boron photoinitiators are disclosed in GB-A-2 307 473, such as

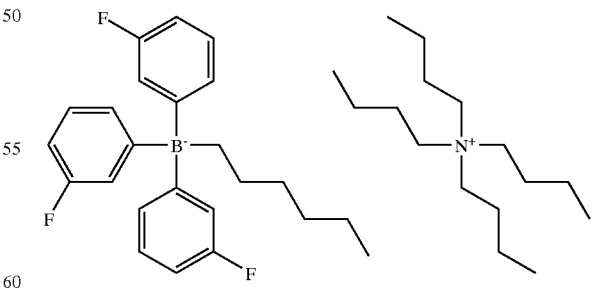

Thus far optimum results have been obtained with a photolatent base belonging to the group of α-amino acetophenones. Examples of α-amino acetophenones which can be used in the photoactivatable coating compositions according to the present invention are: 4-(methylthiobenzoyl)-1-methyl-1-morpholinoethane (Irgacure® 907 ex Ciba Specialty Chemicals) and (4-morpholinobenzoyl)-1-benzyl-1-dimethylamino propane (Irgacure® 369 ex Ciba Specialty Chemicals) disclosed in EP-A-0 898 202. Preferred is an α-amino acetophenone according to the following formula

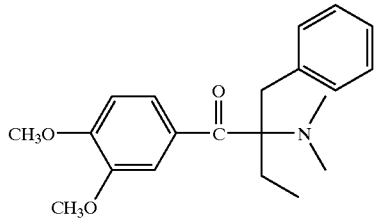

The photolatent base may be used in an amount of between 0.01 to 10 wt. % on solid curable material, preferably 0.05 to 5 wt. %, more preferably 0.05 to 3 wt. %.

For most coating compositions wherein use is made of a photolatent base an acceptable balance between pot life and cure speed can be obtained by the incorporation of a certain amount of organic acid. Preference is given in said case to an organic acid that is compatible with the other parts of the composition. Thus far optimum results have been obtained with dodecylbenzene sulphonic acid. The amount used thereof varies between 0.01 and 20 wt. %, based on the total weight of the coating composition, preferably 0.05 to 10 wt. %, more preferably 0.1 to 5 wt. %.

Though irradiation of most of the α-amino acetophenones known from the literature results in the generation of an active catalyst, for some of them the unexposed places detract from the performance due to a too long curing time. Said problem may be overcome by incorporating a very weak base and/or a metal compound into the composition.

Generally, good results are obtained with metal complexes and/or metal salts which are known as such as catalysts for the isocyanate hydroxyl reaction. Preference is given in said case to metal complexes or metal salts wherein the metal is selected from the group of aluminum, titanium, zirconium, and hafnium. These metals are complexed with carboxylate groups and/or diketones or alkylacetoacetates. Examples of satisfactory catalysts are disclosed in U.S. Pat. No. 5,846,897. Thus far optimum results have been obtained with the aluminum complex K-KAT® XC5218 (ex King Industries) and with organic titanates such as titanium diisopropoxide bis-2,4(pentadionate) (Tyzor® AA ex DuPont). These catalysts may be used in an amount of 0.01 to 10 wt. % on solid curable material, preferably 1 to 5 wt. %.

The coating compositions according to the invention are radiation curable after application and, optionally, evaporation of solvents. In particular, they are suitable for curing by irradiation with UV light. Combinations of IR/UV irradiation are also suitable. Radiation sources which may be used are those customary for UV, such as high- and medium-pressure mercury lamps. In order to avoid any risk involved in handling UV light of very short wave length (UV B and/or UV C light), preference is given, especially for use in automotive refinishing shops, to fluorescent lamps which produce the less injurious UV A light. However, the low intensity of the light produced by said lamps was found to have a detrimental effect on curing the known radically polymerised dual cure systems as a result of oxygen inhibition.

Surprisingly, it has now been found that when a photolatent base is used as the photoinitiator, more particularly when a sensitiser is also employed, there are no problems as a result of oxygen inhibition during irradiation with UV light from fluorescent lamps.

Suitable sensitisers are thioxanthones such as isopropyl thioxanthone according to the following formula

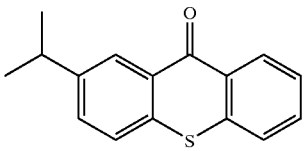

(Quantacure® ITX ex G. Lakes), oxazines, and rhodamines. Colourless surfaces can be obtained with benzophenone and derivatives thereof. Examples of suitable derivatives of benzophenone are:

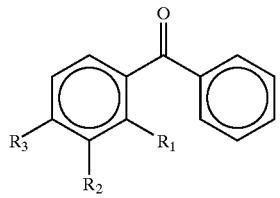

wherein $R_1$, $R_2$, and $R_3$ may be the same or different and stand for $CH_3$ or H (Speedcure® BEM ex Lambson),

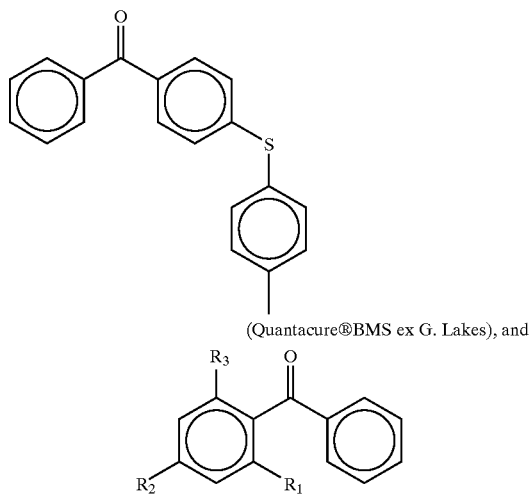

(Quantacure®BMS ex G. Lakes), and wherein $R_1$, $R_2$, and $R_3$ may be the same or different and stand for $CH_3$ or H (Esacure® TZT ex Lamberti).

The sensitiser may be present in amount of 0.1 to 5 wt. % on solid curable material, preferably 0.5 to 2.5 wt. %.

Examples of the isocyanate reactive compound comprising at least one thiol group include a thiol-functional compound comprising at least two thiol-functional groups and a compound comprising at least one thiol-functional group and one hydroxyl-functional group. Also mixtures of these compounds may be used in the compositions of the present invention.

Suitable thiol group-containing compounds are generally prepared by reacting hydroxyl group-containing compounds with thiol group-containing acids, such as 3-mercaptopropionic acid, 2-mercaptopropionic acid, thiosalicylic acid, mercaptosuccinic acid, mercaptoacetic acid, or cysteine. Examples of suitable hydroxyl group-containing compounds are diols, triols, and tetraols, such as 1,4-butane diol, 1,6-hexane diol, 2,2-dimethyl-1,3-propane diol, 2-ethyl-2-propyl-1,3-propane diol, 1,2-, 1,3-, and 1,4-cyclohexane diols, and the corresponding cyclohexane dimethanol, 1,1,1-trimethylol propane, 1,2,3-trimethylol propane, and pentaerythritol. Examples of compounds prepared according to such a method include pentaerythritol tetrakis(3-mercaptopropionate), pentaerythritol tetrakis(2-mercaptoacetate), trimethylol propane tris(3-mercaptopropionate), trimethylol propane tris(2-mercaptopropionate), and trimethylol propane tris(2-mercaptoacetate). Good results have been obtained with trimethylol propane tris(3-mercapto propionate) and pentaerythritol tetrakis(3-mercapto propionate).

A further example of a compound prepared according to such a method consists of a hyperbranched polyol core based on a starter polyol, e.g., trimethylol propane, and dimethylol propionic acid. This polyol is subsequently esterified with 3-mercaptopropionic acid and isononanoic acid. These methods are described in European patent application EP-A 0 448 224 and International patent application WO 93/17060.

Other syntheses to prepare compounds comprising at least two thiol-functional groups involve:

the reaction of an aryl or alkyl halide with NaHS to introduce a pendent thiol group into the alkyl and aryl compounds, respectively;

the reaction of a Grignard reagent with sulphur to introduce a pendent thiol group into the structure;

the reaction of a polymercaptan with a polyolefin according to a Michael addition reaction, a nucleophilic reaction, an electrophilic reaction or a radical reaction;

the reaction of a thiol functional alcohol and an isocyanate functional compound, and the reduction of disulphides.

The compound comprising at least one thiol-functional group and one hydroxyl-functional group may for example have a structure according to the following formula: $T[(C_3H_6O)_nCH_2CHOHCH_2SH]_3$, with T being a triol such as trimethylol propane or glycerol. An example of such a compound is commercially available from Henkel under the trademark Henkel Capcure® 3/800.

Alternatively, the isocyanate reactive compound comprising at least one thiol group is a resin having for example as a backbone a polyester resin, polyurethane resin, polyacrylate resin, or polyether resin. These isocyanate reactive compounds may also comprise hydroxyl groups.

The isocyanate reactive compound comprising at least one thiol group may be a polyester prepared from (a) at least one polycarboxylic acid or reactive derivatives thereof, (b) at least one polyol, and (c) at least one thiol-functional carboxylic acid. The polyesters preferably possess a branched structure. Branched polyesters are conventionally obtained through condensation of polycarboxylic acids or reactive derivatives thereof, such as the corresponding anhydrides or lower alkyl esters, with polyalcohols, when at least one of the reactants has a functionality of at least 3.

Examples of suitable polycarboxylic acids or reactive derivatives thereof are tetrahydrophthalic acid, tetrahydrophthalic anhydride, hexahydrophthalic acid, hexahydrophthalic anhydride, methyl hexahydrophthalic acid, methyl hexahydrophthalic anhydride, dimethylcyclohexane dicarboxylate, 1,4-cyclohexane dicarboxylic acid, 1,3-cyclohexane dicarboxylic acid, phthalic acid, phthalic anhydride, isophthalic acid, terephthalic acid, 5-tert. butyl isophthalic acid, trimellitic anhydride, maleic acid, maleic anhydride, fumaric acid, succinic acid, succinic anhydride, dodecenyl succinic anhydride, dimethyl succinate, glutaric acid, adipic acid, dimethyl adipate, azelaic acid, and mixtures thereof.

Examples of suitable polyols include trimethylol propane, trimethylol ethane, glycerol, 1,2,6-hexanetriol, ethylene glycol, 1,2-propylene glycol, 1,3-propylene glycol, 2-methylpropane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentane diol, 3-methylpentane diol, 1,6-hexane diol, 2,2,4-trimethyl pentane-1,3-diol, dimethylol propionic acid, pentaerythritol, di-trimethylol propane, dipentaerythritol, and mixtures thereof. Examples of suitable thiol-functional organic acids include 3-mercaptopropionic acid, 2-mercaptopropionic acid, thio-salicylic acid, mercaptosuccinic acid, mercaptoacetic acid, cysteine, and mixtures thereof.

Optionally, monocarboxylic acids and monoalcohols may be used in the preparation of the polyesters. Preferably, $C_4$–$C_{18}$ monocarboxylic acids and $C_6$–$C_{18}$ monoalcohols are used. Examples of the $C_4$–$C_{18}$ monocarboxylic acids include pivalic acid, hexanoic acid, heptanoic acid, octanoic acid, nonanoic acid, 2-ethylhexanoic acid, isononanoic acid, decanoic acid, lauric acid, myristic acid, palmitic acid, isostearic acid, stearic acid, hydroxystearic acid, benzoic acid, 4-tert. butyl benzoic acid, and mixtures thereof. Examples of the $C_6$–$C_{18}$ monoalcohols include cyclohexanol, 2-ethylhexanol, stearyl alcohol, and 4-tert. butyl cyclohexanol. Good results may also be obtained with an aqueous thiol-functional polyurethane dispersion which is obtainable by first preparing an isocyanate-functional polyurethane from diols, diisocyanates, and building blocks containing groups which facilitate the stabilisation of the resin in an aqueous dispersion, followed by reaction of the isocyanate-functional polyurethane with a polyfunctional thiol in a base-catalysed addition reaction, followed by dispersion in water.

The isocyanate reactive compound comprising at least one thiol group may be a thiol-functional polyacrylate. Such polyacrylate can be derived from (meth)acrylic monomers such as (meth)acrylic acid, methyl (meth)acrylate, butyl (meth)acrylate, a vinyl derivative such as styrene, and optionally hydroxy-functional acrylic monomers, such as hydroxy ethyl (meth)acrylate, hydroxy propyl (meth)acrylate, hydroxy butyl (meth)acrylate and the like, or mixtures thereof, wherein the terms (meth)acrylate and (meth)acrylic acid refer to both methacrylate and acrylate, as well as methacrylic acid and acrylic acid, respectively. The thiol group is introduced by the reaction product of dimethyl-m-isopropenyl benzyl isocyanate and mercapto ethanol. Alternatively, glycidyl methacrylate is introduced in the polymer to prepare an epoxy functional polyacrylate. The epoxy groups are then reacted with suitable thiol-functional organic acids such as mentioned above. The polyacrylate is prepared by conventional methods, for instance, by the slow addition of appropriate monomers to a solution of an appropriate polymerization initiator, such as an azo or peroxy initiator.

Also included in the coating compositions of the invention may be di-, tri-, or higher thiol-functional diluents such as ethane dithiol or bis-beta-mercapto-ethyl sulphide. Preference is given to the use of higher-molecular weight thiol-functional compounds, which may be obtained by reaction of a polythiol-functional compound with a polyisocyanate.

The most preferred thiol-functional compound is pentaerythritol tetrakis(3-mercaptopropionate).

The organic polyisocyanate includes polyfunctional, preferably free polyisocyanates, with an average NCO functionality of 2.5 to 5, and may be (cyclo)aliphatic, araliphatic or aromatic in nature. The organic polyisocyanate may be blocked. The polyisocyanate may include biuret, urethane, uretdione, and isocyanurate derivatives. Examples of these organic polyisocyanates include 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl)methane, 1,4- diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylene diisocyanate, 1,4-xylylene diisocyanate, 1-isocyanato-3-(isocyanato methyl)-1-methyl cyclohexane, m-α,α-α',α'-tetramethyl xylylene diisocyanate, the above-mentioned derivatives thereof, and mixtures thereof. Normally, these products are liquid at ambient temperature and commercially available in a wide range. Particularly preferred isocyanate curing agents are triisocyanates and adducts. Examples thereof are 1,8-diisocyanato-4-(isocyanatomethyl)octane, the adduct of 3 moles of toluene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret trimer of 1,6-diisocyanatohexane, the adduct of 3 moles of m-α,α-α',α'-tetramethyl xylene diisocyanate to 1 mole of trimethylol propane, and mixtures thereof. Preferred are cyclic trimers (isocyanurates) and uretdiones of 1,6-hexane diisocyanate and isophorone diisocyanate. Usually these compounds contain small quantities of their higher homologues.

Optionally, a water borne coating composition according to the present invention may also comprise an organic hydrophilic polyisocyanate compound substituted with non-ionic groups, such as $C_1$–$C_4$ alkoxy polyalkylene oxide groups. Preferably, 30 wt. % of non-ionic groups will be present on the total solid polyisocyanate compound, more preferably 20 wt. %, most preferably 15 wt. %. Preferred are the isocyanurates of 1,6-hexane diisocyanate and isophorone diisocyanate substituted with methoxy polyethylene glycol.

Optionally, a hydroxyl-functional compound comprising at least two hydroxyl-functional groups may be present in the curable material. The hydroxyl-functional compound comprising at least two hydroxyl-functional groups may be selected from polyester polyols, polyether polyols, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, such as castor oil and trimethylol propane, may be included. A preferred polyol is an acrylate polyol. More preferred is an acrylate polyol available from Akzo Nobel Resins having the trade name Setalux® 1157.

The polyisocyanate and the compound comprising isocyanate reactive groups should be mixed such that the ratio of isocyanate groups to isocyanate reactive groups is in the range of 0.5–3:1, preferably 0.75–2.5:1, and more preferably 1–2:1.

If hydroxyl-functional compounds are present in the coating composition, catalysts for the cross-linking of isocyanate groups with hydroxyl groups may be present. Examples thereof include Sn-based catalysts, such as dibutyl tin dilaurate and dibutyl tin diacetate.

The polyisocyanate may be mixed with the isocyanate reactive compound by any suitable technique. However, simply stirring usually is sufficient. Sometimes it may be useful to dilute the polyisocyanate somewhat with an organic solvent like ethyl acetate or 1-methoxy-2-propyl acetate to reduce its viscosity.

The pot life of the coating composition at ambient temperature usually is more than 1 day, depending on the catalysts used and their amount.

The composition according to the present invention may be a water borne composition, a solvent borne composition or a solvent-free composition. Since the composition may be composed of liquid oligomers, it is especially suitable for use as a high-solids composition or a solvent-free composition. Alternatively, the coating composition of the present invention may be an aqueous powder coating dispersion wherein the isocyanate reactive compound comprising at least one thiol group has a Tg above 20° C. The coating composition may as well be used in powder coating compositions and hot melt coatings compositions. Preferably, the theoretical volatile organic content (VOC) in the composition is less than about 450 g/l, more preferably less than about 350 g/l, most preferably less than about 250 g/l.

The coating compositions may further comprise other ingredients, additives or auxiliaries, such as pigments, dyes, emulsifiers (surfactants), pigment dispersion aids, leveling agents, anti-cratering agents, antifoaming agents, antisagging agents, heat stabilisers, UV absorbers, antioxidants, and fillers.

The coating composition of the present invention may be applied to any substrate. The substrate may be, for example, metal, plastic, wood, glass, ceramic, or some other coating layer. The other coating layer may be comprised of the coating composition of the current invention or it may be a different coating composition. The coating compositions of the current invention show particular utility as clear coats, base coats, pigmented top coats, primers, and fillers. Preferably, the coating composition according to the present invention may be used as clear coat or as primer. In a clear coat application, the use of α-amino acetophenone as photolatent base is preferred. In a primer application, the use of N-substituted 4-(o-nitrophenyl)dihydropyridines as photolatent base is preferred.

The coating compositions can be applied by conventional means such as by spray gun, brush, or roller, spraying being preferred. Curing temperatures preferably are between 0 and 100° C. and more preferably between 20 and 60° C. The compositions are particularly suitable in the preparation of coated metal substrates, such as in the refinish industry, in particular the body shop, to repair automobiles and transportation vehicles, and in finishing large transportation vehicles such as trains, trucks, buses, and aeroplanes.

In the case of the coating composition being a clear coat, the base coat may be a conventional base coat known in the coating art. Examples are solvent borne base coats, e.g., Autobase® ex Akzo Nobel Coatings BV, based on cellulose acetobutyrate, acrylic resins, and melamine resins, and water borne base coats, e.g., Autowave® ex Akzo Nobel Coatings BV, based on an acrylic resin dispersion and polyester resin. Furthermore, the base coat may comprise pigments (colour pigments, metallics and/or pearls), wax, solvents, flow additives, neutralising agent, and defoamers. Also high solids base coats can be used. These are, for instance, based on polyols, imines, and isocyanates. The clear coat composition is applied to the surface of a base coat and then cured. An intermediate curing step for the base coat may be introduced.

The invention will be illustrated with reference to the following examples. Of course these examples are submitted for a better understanding of the invention only; they are not to be construed as limiting in any manner the scope thereof.

EXAMPLES

In the following examples, the curing time of a number of coating compositions according to the invention is disclosed.

A coating is cured when the mark from firm pushing with the thumb does not leave any imprint.

The times mentioned under "pot life" correspond to the time elapsed until the viscosity had doubled.

The Persoz Hardness was determined in accordance with French Industrial Standard method NF T30-016, the results being expressed in seconds.

Solvent resistance was measured by exposing the film to methyl ethyl ketone for one minute. In the test results, 0 means that the film was totally dissolved, and 5 means that the film was not damaged at all.

Water resistance was measured by exposing the film to water for one hour. In the test results, 0 means that the film was totally dissolved, and 5 means that the film was not damaged at all.

Example 1

Prepared were five photoactivatable coating compositions each comprising a photolatent base selected from the group of N-methyl nifedipine (base 1), N-butyl 2,6-dimethyl 4-(2-nitrophenyl) 1,4-dihydropyridine 3,5-dicarboxylic acid diethyl ester (base 2) and N-methyl 2,6-dimethyl 4-(4,5-dimethoxy-2-nitrophenyl) 1,4-dihydropyridine 3,5-dicarboxylic acid diethyl ester (base 3).

The photoactivatable compositions A, B, C, D, and E comprised 56 parts by weight (pbw) of Desmodur® N3390 (an aliphatic trimer of hexamethylene diisocyanate ex Bayer) and 27 pbw of trimethylol propane tris(3-mercapto propionate).

The weight percentage of the photolatent base varied between 0.1 and 0.4.

A 50 μm thick film was drawn out onto a glass plate and exposed to UV A light (fluorescent lamps, type Cleo® ex Philips) at a distance of 10 cm (7 mW/cm$^2$). The results of the experiments carried out at ambient temperature both in the dark and after 10 minutes' exposure are given in Table 1. The percentages quoted in the examples denote percentages by weight, and parts are parts by weight.

TABLE 1

| Composition | A | B | C | D | E |
|---|---|---|---|---|---|
| Base 1 | 0.4 | 0.2 | 0.1 | | |
| Base 2 | | | | 0.4 | |
| Base 3 | | | | | 0.4 |
| curing after exposure (minutes) | 2 | 5 | 10 | 2 | 1 |
| curing in the laboratory (minutes) | 60 | 70 | 100 | 75 | 25 |
| curing in the dark | >1 day | >1 day | >1 day | >1 day | >1 day |
| pot life | 4 days | 4 days | 4 days | 4 days | <1 day |

According to the results mentioned in the above table, the time for curing increases with decreasing nifedipine concentration. The pot life is always acceptable, but curing in the dark detracts from the performance. However, it was found that if instead of curing in darkness the whole film was at least exposed to laboratory conditions, the curing time of the parts only exposed to light available under laboratory conditions was quite acceptable and varied between 25 to 100 minutes, depending on the type of photolatent base and its concentration.

Example 2

Example 1 was repeated, with the proviso that the photolatent base used was 2 parts by weight (pbw) of a tetrabutyl ammonium borate according to the following formula:

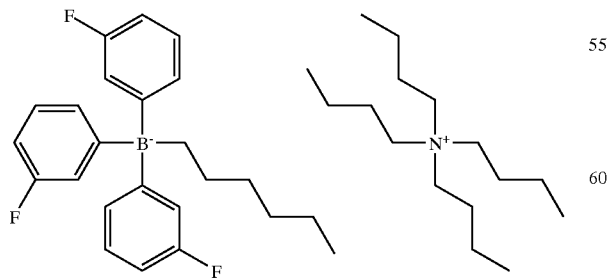

The photocurable compositions A and B comprised 50 pbw of Tolonate® HDT-LV (an aliphatic trimer of hexamethylene diisocyanate ex Rhône-Poulenc) and 27 pbw of trimethylol propane tris(3-mercapto propionate).

Composition A contained 1 pbw of sensitiser Quantacure® ITX (ex G. Lakes).

The results are mentioned in Table 2.

TABLE 2

| Composition (pbw) | A | B |
|---|---|---|
| Tolonate ® HDT-LV | 50 | 50 |
| trimethylol propane tris(3-mercaptopropionate) | 27 | 27 |
| [tetrafluorophenyl borate structure] | 2 | 2 |
| [tetrabutylammonium structure] | | |
| Quantacure ® ITX | 1 | — |
| curing time after exposure to UV A | 2 minutes | >1 day |
| curing time in the laboratory | 3 to 4 hours | >1 day |
| pot life | >1 day | >1 day |

According to the results mentioned in the above Table, in this case the presence of a sensitiser is a prerequisite for obtaining satisfactory results.

Example 3

Example 1 was repeated, with the proviso that the photolatent base used was either 0.4 or 1.8 parts by weight (pbw) of an α-amino acetophenone, i.e. (4-morpholinobenzoyl)-1-benzyl-1-dimethylamino propane (Irgacure® 369 ex Ciba Specialty Chemicals).

The photocurable compositions A, B, and C each comprised 50 pbw of Tolonate® HDT-LV (an aliphatic trimer of hexamethylene diisocyanate ex Rhone-Poulenc) and 27 pbw of trimethylol propane tris(3-mercapto propionate).

Composition A contained 1.8 pbw of Irgacure® 369, composition B contained 0.4 pbw, and composition C contained 0.4 pbw and 0.1 pbw of dodecyl benzene sulphonic acid.

The results are mentioned in Table 3.

TABLE 3

| Composition, pbw | A | B | C |
|---|---|---|---|
| Tolonate ® HDT-LV | 50 | 50 | 50 |
| trimethylol propane tris(3-mercaptopropionate) | 27 | 27 | 27 |
| dodecylbenzene sulphonic acid | — | — | 0.1 |
| Irgacure ® 369 | 1.8 | 0.4 | 0.4 |
| curing time after exposure to UV-A (minutes) | 1 | 1 | 1.5 |
| curing time in the laboratory (minutes) | 45 | 45 | 60 |
| pot life | 1.5 hours | 1.5 hours | >5 days |

According to the results mentioned in Table 3, in this case the presence of a sulphonic acid makes for a considerable improvement of the pot life, whereas the curing times after exposure to UV A or under available light in the laboratory are hardly affected.

Example 4

Prepared were two photoactivatable coating compositions each comprising as a photolatent base 1.1 parts by weight (pbw) of an α-amino acetophenone according to the formula:

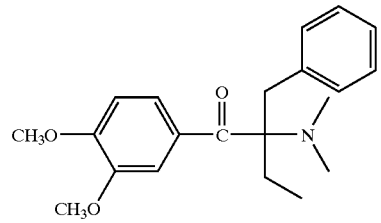

The composition as such is mentioned in Table 4.

TABLE 4

| Composition, pbw | A | B |
|---|---|---|
| pentaerythritol tetrakis (3-mercaptopropionate) | 10 | 10 |
| Tolonate ® HDT - LV | 17.9 | 17.9 |
| Byk 306 (10% in butyl acetate) | 0.63 | 0.63 |
| α-amino acetophenone (10% in butyl acetate) | 1.1 | 1.1 |
| Tyzor ® AA (75 wt. % titanium diisopropoxide bis 2,4 (pentadionate) in isopropanol) ex Dupont | — | 1.16 |

The pot life of composition A was 6 hours, whereas that of composition B, which contained an additional amount of a metal complex as catalyst, was 2 hours. A 75 μm thick film was drawn out onto a glass plate and exposed to UV A light (fluorescent lamps, type Cleo® ex Philips) at a distance of 20 cm (3 mW/cm²). The unexposed films were cured after having been exposed to UV-A light for 1 and 2 minutes, respectively, or not.

The curing times data of the exposed and unexposed films is given in Table 5.

TABLE 5

| | Curing time of film | | | |
|---|---|---|---|---|
| Exposure time UV-A | 0 | 0 | 1 minute | 2 minutes |
| conditions of preservation | Darkness | Laboratory | laboratory | laboratory |
| composition A | 330 minutes | 90 minutes | 1.5 minutes | <2 minutes |
| composition B | 75 minutes | 60 minutes | 1.5 minutes | <2 minutes |

According to the results mentioned in Table 5, in this case the presence of an additional catalyst has no or hardly any influence on the curing time of a film exposed to UV A light. However, dark curing was accelerated to a considerable extent from 330 to 75 minutes by the incorporation of an additional catalyst. The obtained films were examined for their resistance to methylethyl ketone and water. After 7 days the Persoz hardness was measured.

The resistance to methylethyl ketone of the obtained coating layers is given in Table 6.

TABLE 6

| resistance to methylethyl ketone after 24 hrs (I)/7 days (II) drying time | | | | |
|---|---|---|---|---|
| Exposure time UV-A | 0 | 0 | 1 minute | 2 minutes |
| conditions of preservation | Darkness | laboratory | laboratory | laboratory |
| composition A | (I)2/(II)5 | (I)3/(II)5 | (I)5/(II)5 | (I)5/(II)5 |
| composition B | (I)5/(II)5 | (I)5/(II)5 | (I)5/(II)5 | (I)5/(II)5 |

The resistance to water of the obtained coating layers is given in Table 7.

TABLE 7

| resistance to water after 24 hrs (I)/7 days (II) drying time | | | | |
|---|---|---|---|---|
| Exposure time UV-A | 0 | 0 | 1 minute | 2 minutes |
| conditions of preservation | Darkness | laboratory | laboratory | laboratory |

TABLE 7-continued

| resistance to water after 24 hrs (I)/7 days (II) drying time | | | | |
|---|---|---|---|---|
| composition A | (I)2/(II)5 | (I)3/(II)5 | (I)5/(II)5 | (I)5/(II)5 |
| composition B | (I)5/(II)5 | (I)5/(II)5 | (I)5/(II)5 | (I)5/(II)5 |

The Persoz hardness of the obtained coating layers is given in Table 8.

TABLE 8

| Persoz hardness after 7 days drying time | | | | |
|---|---|---|---|---|
| Exposure time UV-A | 0 | 0 | 1 minute | 2 minutes |
| conditions of preservation | darkness | laboratory | laboratory | laboratory |
| composition A | 235" | 223" | 305" | 305" |
| composition B | 286" | 308" | 288" | 298" |

Example 5

Example 1 was repeated, with the proviso that the photolatent base used was 2.22 parts by weight (pbw).of an α-amino acetophenone according to the formula:

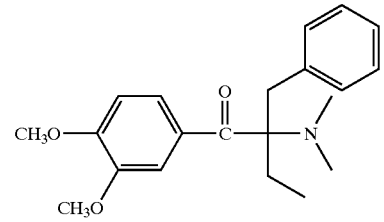

In this example it is shown that not only the choice of a specific photoinitiator, and, depending on the type of photoinitiator, the additional use of an acid and/or base, but also the type of polyisocyanate can be an important parameter for obtaining a good balance between pot life and drying or curing in the dark.

The pot life and curing conditions of 6 compositions are given in Table 9.

TABLE 9

| Composition, pbw | | 2 | | 4 | | 6 |
|---|---|---|---|---|---|---|
| Comparative composition, pbw | 1 | | 3 | | 5 | |
| Pentaerythritol tetrakis (3-mercaptopropionate) | 20 | 20 | 20 | 20 | 20 | 20 |
| Tolonate ® HDT - LV | — | — | 26.90 | 26.90 | 35.86 | 35.86 |
| Desmodur ® N3400 (ex Bayer) | 38.93 | 38.93 | 9.73 | 9.73 | — | — |
| α-amino acetophenone (10% in butyl acetate) | — | 2.22 | — | 2.22 | — | 2.22 |
| Byk 306 (10% in butyl acetate) | 2.60 | 2.60 | 2.60 | 2.60 | 2.60 | 2.60 |
| pot life (minutes) | 15 | 15 | 50 | 24 | >480 | 130 |
| drying in the dark (minutes) | 40 | 35 | 50 | 45 | >1260 | 990 |
| drying in UV-A (minutes) | 40 | 1 | 50 | 1.5 | >1260 | 2 |

From the results mentioned in Table 9 it appears that the use of Desmodur® N3400 is attended with a too short pot life, which can be restored by combining said isocyanate with Tolonate® HDT-LV.

Example 6

Example 1 was repeated with the proviso that a coating composition comprising a physical mixture of a hydroxyl-functional resin and a thiol-functional resin was applied.

A hydroxyl-functional acrylate, Setalux 1157 XS-54 ex Akzo Nobel Resins (Ew(OH)=693 g, s.c.=54%), was mixed with pentaerythritol tetrakis (3-mercaptopropionate). Dibutyl tin dilaurate (DBTL) was added as a catalyst for the NCO/OH reaction. The results are mentioned in Table 10.

TABLE 10

| Composition, pbw | |
|---|---|
| pentaerythritol tetrakis (3-mercaptopropionate) | 12.5 |
| Setalux 1157 XS-54 | 71 |
| Tolonate HDT/LV | 33 |
| Byk 306 (10% in butyl acetate) | 3.9 |
| α-amino acetophenone (10% in butyl acetate) as in Ex. 4 | 3.3 |
| DBTL (10% in butyl acetate) | 8.2 |
| time to dry after UV-A irradiation (fluorescent lamps, type Cleo ® ex Philips, distance 10 cm, 7 mW/cm$^2$) | 10 min. |
| time to dry in the dark | >6 hours |
| pot life | >6 hours |

Example 7

Example 1 was repeated with the proviso that a resin having both hydroxyl and thiol functionality prepared as follows was applied.

In a first step a polyester was prepared from 31.05 pbw pentaerythritol, 1.55 pbw dipentaerythritol, 27.4 pbw hexahydrophthalic anhydride, and 10 pbw isononanoic acid at 230° C. under a nitrogen blanket with xylene refluxing to an acid value between 14 and 18 mg KOH/g solids. The reaction mixture was then cooled down to 180° C.

In a second step, 30 pbw 3-mercapto propionic acid were dosed to the reaction mixture at 180° C under a nitrogen blanket with xylene refluxing. At a conversion of more than 75% a solution of tetra-isopropyl titanate in xylene was dosed (1.0 wt. % tetra-isopropyl titanate on total solids). The esterification reaction was continued under reduced pressure until the acid value was 8 to 11 mg KOH/g solids. Subsequently, the xylene was distilled off under reduced pressure. The polyester dispersion was diluted with n-butyl acetate to a solids content of 75%. The resin solution was filtered over a pressure filter at 70° C.

A polyester resin having both hydroxyl- and thiol-functional groups was obtained with a solids content of 77.8% in butyl acetate, an Ew (OH)=344, an Ew (SH)=320, and an Av=9.9.

The results are mentioned in Table 11.

TABLE 11

| Composition, pbw | |
|---|---|
| resin A (g) | 50.0 |
| Tolonate HDT-LV (g) | 48.18 |
| BYK 306 (10% in butyl acetate) | 4.35 |
| DBTL (10% in butyl acetate) | 8.71 |
| α-amino acetophenone (10% in butyl acetate) as in Ex. 4 | 8.71 |
| butyl acetate | 14.0 |
| time to dry after UV A irradiation | 10 min. |

TABLE 11-continued

| Composition, pbw | |
|---|---|
| (fluorescent lamps, type Cleo ® ex Philips, distance 10 cm, 7 mW/cm2) | |
| time to dry in the dark | 8 hrs |
| pot life | 2 hrs |

Example 8

In this example, a primer was formulated.

| Composition, pbw | |
|---|---|
| pentaerythritol tetrakis (3-mercaptopropionate) | 60 |
| Disperbyk 110 | 7.048 |
| added while stirring in dissolver | |
| zinc sulphate | 45.271 |
| barium sulphate | 180.90 |
| Silica (Aerosil 380) | 0.60 |
| butyl acetate | 6.75 |
| dissolver on maximum speed till fineness <25 μm | |
| Tolonate HDT-LV | 86 |
| α-amino acetophenone (10% in butyl acetate) as in Ex. 4 | 14.62 |
| Byk 306 (10% in butyl acetate) | 14.62 |
| xylene | 16.11 |
| butyl acetate | 16.11 |

The primer formulation was sprayed over a steel plate with a dry film thickness of ±50 μm. Just after spraying the film was irradiated with UV-A light (fluorescent lamps, type Cleo® ex Philips, distance 50 cm, 1 mW/cm$^2$). The film was dry and ready to sand after 5 minutes. In the dark the drying took 2 hours. Two hours after mixing the results were still the same.

Example 9

A water borne formulation according to the invention was prepared as follows.

| Composition, pbw | |
|---|---|
| Bayhydur LS2032 ex Bayer | 32 |
| propylene glycol monomethylether acetate | 8 |
| dodecyl benzene sulphonic acid (70%) | 0.64 |
| Byk 346 | 0.7 |
| pentaerythritol tetrakis (3-mercaptopropionate) | 13.4 |
| α-amino acetophenone as in Ex. 4 (24.9% in propylene glycol monomethylether acetate) | 3.6 |
| water | 20.3 |

The water borne formulation was applied with a drawing bar on a tin plate in a dry film thickness of 70 μm. After 1 hour of flash-off time the film was irradiated with UV-A light (fluorescent lamps, type Cleo® ex Philips, distance 10 cm, 7 mW/cm$^2$). The film was dry after 2 minutes. In the dark the drying took another 6 hours. Two hours after mixing the results were still the same.

Example 10

Composition B of example 3 was applied to two metal panels coated with commercial available base coats, i.e. Autowave and Autobase ex Akzo Nobel Coatings BV. the panels were exposed to UV A light (fluorescent lamps, type Cleo® ex Philips) at a distance of 10 cm (7 mW/cm$^2$). The clear coats were dry after 1 minute.

We claim:

1. A method of producing a coating with a rapidly curing surface comprising
   i) preparing a photoactivatable coating composition by mixing at least one photoinitiator and a base-catalysed polymerisable or curable organic material comprising at least one polyisocyanate and at least one compound comprising isocyanate reactive groups, wherein the isocyanate reactive groups comprise at least one thiol group and the photoinitiator is a photolatent base;
   ii) applying the photoactivatable coating composition to a substrate, and
   iii) curing the applied coating composition with UV radiation.

2. A method according to claim 1 wherein the method is utilized in the refinish industry or in finishing large transportation vehicles.

3. A method according to claim 1 wherein the substrate is a metal substrate.

4. A method of producing on a substrate a multi-layer lacquer coating comprising a filler layer wherein the filler layer is formed by
   i) applying a photoactivatable coating composition comprising a filler-component, at least one photoinitiator and a base-catalysed polymerisable or curable organic material comprising at least one polyisocyanate and at least one compound comprising isocyanate reactive groups, wherein the isocyanate reactive groups comprise at least one thiol group and the photoinitiator is a photolatent base, and
   ii) curing the applied filler layer by UV radiation.

5. A method of producing a clear coat on a substrate comprising applying to the substrate a photoactivatable clear coat composition comprising at least one photoinitiator and a base-catalysed polymerisable or curable organic material comprising at least one polyisocyanate and at least one compound comprising isocyanate reactive groups, wherein the isocyanate reactive groups comprise at least one thiol group and the photoinitiator is a photolatent base; and curing the applied clear coat by UV radiation.

6. A method according to claim 5 wherein, the clear coat composition is applied to the surface of a base coat.

7. A method of producing a multi-layer lacquer coating on a substrate comprising the steps of applying a radiation curable coating composition to a substrate having at least one coating layer thereon; wherein the radiation curable coating composition comprises a photolatent base and a base-catalyzed polymerizable or curable organic material comprising at least one polyisocyanate and at least one compound having isocyanate reactive groups, wherein the isocyanate reactive groups comprise at least one thiol group; and curing or hardening the applied radiation curable coating composition by exposure to radiation.

8. A method according to claim 7 wherein the radiation exposure is provided by a source of UV light.

9. A method according to claim 8 wherein the source of UV light comprises high pressure mercury lamps, low pressure mercury lamps, fluorescent lamps or a combination thereof.

* * * * *